United States Patent [19]
Gahang

[11] Patent Number: 5,920,656
[45] Date of Patent: Jul. 6, 1999

[54] SHADING CORRECTION CIRCUIT AND METHOD IN IMAGE PROCESSING APPARATUS

[75] Inventor: Goo-Soo Gahang, Seoul, Rep. of Korea

[73] Assignee: SamSung Electronics Co., Ltd., Kyungki-do, Rep. of Korea

[21] Appl. No.: 08/683,840

[22] Filed: Jul. 19, 1996

[30] Foreign Application Priority Data

Jul. 21, 1995 [KR] Rep. of Korea ................. 95-21624

[51] Int. Cl.6 .................................. G06K 9/40; H04N 1/40
[52] U.S. Cl. ........................ 382/274; 352/461; 352/463
[58] Field of Search .................................. 382/274, 254; 358/461, 464, 465, 455, 406, 494, 463

[56] References Cited

U.S. PATENT DOCUMENTS

| 4,523,229 | 6/1985 | Kanmoto .................................. 358/461 |
| 4,827,351 | 5/1989 | Sakamoto . |
| 4,829,379 | 5/1989 | Takaki .................................. 358/461 |
| 4,888,492 | 12/1989 | Arimoto . |
| 4,947,445 | 8/1990 | Sakamoto . |
| 5,001,768 | 3/1991 | Mita et al. . |
| 5,062,144 | 10/1991 | Murakami . |
| 5,267,055 | 11/1993 | Sakamoto et al. . |
| 5,317,421 | 5/1994 | Ito .................................. 358/464 |
| 5,388,167 | 2/1995 | Koga et al. . |
| 5,388,168 | 2/1995 | Sakashita et al. . |
| 5,398,119 | 3/1995 | Suzuki et al. .................................. 358/461 |

*Primary Examiner*—Thomas D. Lee
*Attorney, Agent, or Firm*—Robert E. Bushnell, Esq.

[57] ABSTRACT

A shading correction method for an image processing system contemplates the steps of: sequentially scanning first, second and third lines of a white reference and storing a brightness value of each pixel according to each line; averaging brightness values of pixels from identical columns in the first, second and third lines to calculate first median brightness values, and generating a first new line composed of pixels having the first median brightness values; and sequentially selecting pixels of the first new line, averaging brightness values of a selected pixel and pixels on first and second sides of the selected pixel to calculate second median brightness values, and generating a second new line composed of pixels having the second median brightness values.

20 Claims, 6 Drawing Sheets

| | |
|---|---|
| L1 | FIRST LINE MEMORY 2kBytes(over 1728x8bits) |
| L2 | SECOND LINE MEMORY 2kBytes(over 1728x8bits) |
| L3 | THIRD LINE MEMORY 2kBytes(over 1728x8bits) |
| SHAD | MEDIAN LINE MEMORY 2kBytes(over 1728x8bits) |
| TMP1 | 1 Byte |
| TMP2 | 1 Byte |
| TMP3 | 1 Byte |
| MEDIAN | 1 Byte |
| ADDR_LINE1 | 2 Bytes |
| ADDR_LINE2 | 2 Bytes |
| ADDR_LINE3 | 2 Bytes |
| ADDR_SHAD | 2 Bytes |
| CNT | 2 Bytes |

SHADING CORRECTION CIRCUIT AND METHOD IN IMAGE PROCESSING APPARATUS

CROSS-REFERENCE TO RELATED APPLICATIONS

This application makes reference to, incorporates the same herein, and claims all benefits accruing under 35 U.S.C. §119 arising from an application for Shading Correction Circuit And Method in Image Processing Apparatus earlier filed in the Korean Industrial Property Office on Jul. 21, 1995 and there duly assigned Ser. No. 21624/1995.

BACKGROUND OF THE INVENTION

The present invention relates to a shading correction circuit and method in an image processing system that scans a document to binarize an image of the scanned document, and more particularly, to a shading correction circuit and method capable of removing adverse effects due to impulse noise, or dust which may be accumulated on a white panel or roller.

A conventional image scanning device photoelectrically reads an image on a document using an image sensor, such as a charge-coupled device CCD. In reading the image, the density of the read image may vary due to variations in a light source for illuminating a read object or in other optical members, or due to nonuniform sensitivity of a plurality of light-receiving elements of the image sensor. In view of this problem, a shading correction operation can be implemented to enable image reading to be performed with a high degree of reliability. Conventional means for performing shading correction are disclosed, for example, in U.S. Pat. No. 5,001,768 entitled Image Reading Apparatus and issued to Mita et al. which performs shading correction using a logarithmic conversion scheme. While this type of conventional scheme possesses merit in its own right, I believe that an improved circuit and method for performing shading correction that avoids reliance on logarithmic conversions can be contemplated.

SUMMARY OF THE INVENTION

Accordingly, it is an object of the present invention to provide an improved shading correction circuit and method for an image processing system.

It is another object to provide a shading correction circuit and method for an image processing system that is capable of removing adverse effects due to impulse noise or dust that is accumulated on a white panel or roller.

It is still another object to provide a shading correction circuit and method for an image processing system that avoids reliance on logarithmic conversions.

To achieve these and other objects, the present invention provides a shading correction method for an image processing system. The method contemplates the steps of: sequentially scanning first, second and third lines of a white reference and storing a brightness value of each pixel according to each line; averaging brightness values of pixels from identical columns in the first, second and third lines to calculate first median brightness values, and generating a first new line comprised of pixels having the first median brightness values; and sequentially selecting pixels of the first new line, averaging brightness values of a selected pixel and pixels on first and second sides of the selected pixel to calculate second median brightness values, and generating a second new line comprised of pixels having the second median brightness values.

These and other objects can also be achieved with a shading correction circuit for an image processing system. The shading correction circuit contemplates an image sensor for scanning a white reference source to generate analog image data representative of brightness values of three consecutive lines of pixels. An analog-to-digital converter converts the analog image data output from the image sensor into digital image data. First, second and third line memories respectively store the digital image data corresponding to first, second and third lines of the three consecutive lines of pixels. First, second and third buffers temporarily store the digital image data stored in the first, second and third line memories, respectively. A first address generating unit sequentially generates first addresses for assigning the digital image data to the first, second and third buffers. A counting unit maintains a count value so that generation of the first addresses by the first address generating unit corresponds to a number of pixels in one line. A first median detecting unit reads the digital image data stored in the first, second and third buffers in response to generation of the first addresses, and detects first median brightness values from the digital image data. Each first median brightness value represents an average of brightness values of pixels from a same column and each of the three consecutive lines. A first median storing unit stores the first median brightness values detected by the first median detecting unit in correspondence with the first addresses generated by the first address generating unit. A second address generating unit generates second addresses to enable reading of the first median brightness values stored in the first median storing unit. A second median detecting unit reads the first median brightness values stored in the first median storing unit in response to generation of the second addresses, and detects second median brightness values from the first median brightness values. Second median brightness values include values representing an average of the first median brightness value of a corresponding pixel and the first median brightness values of pixels positioned on first and second sides of the corresponding pixel. A second median storing unit stores the second median brightness values detected by the second median detecting unit in correspondence with the second addresses generated by the second address generating unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
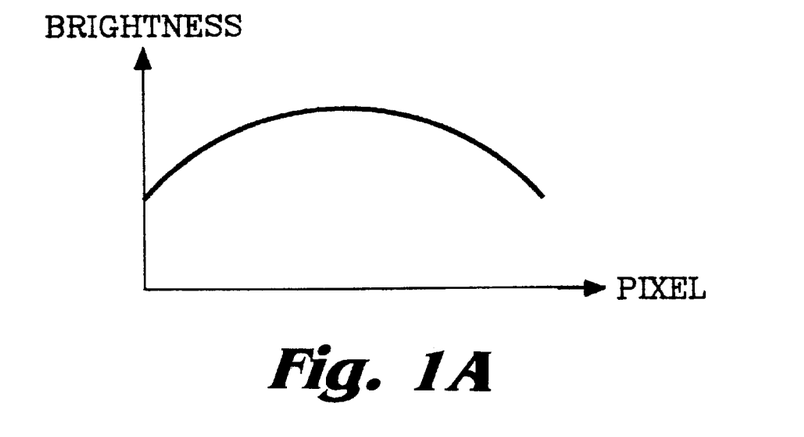
FIG. 1A illustrates a shading waveform of a scanner using a charge-coupled device CCD.
Figure 1B:
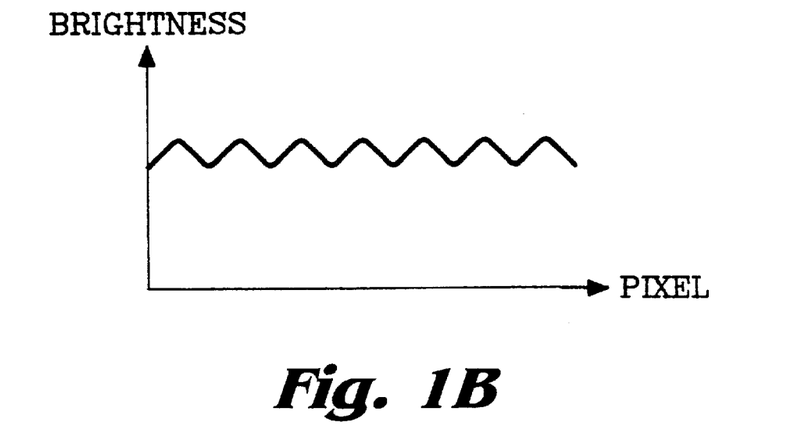
FIG. 1B illustrates a shading waveform of a scanner using a contact image sensor CIS.

Turning now to the drawings and referring to FIGS. 1A and 1B, shading waveforms of a scanner using a charge-coupled device CCD, and a scanner using a contact image sensor CIS are respectively shown. Generally, scanners using a charge-coupled device CCD or a contact image sensor CIS exhibit waveforms as respectively shown FIGS. 1A and 1B as a result of scanning a white reference panel or a white reference roller. These waveforms, which are referred to as shading waveforms, have imperfections due to differences in the electrical light intensity distribution and light path of the light source or light element.

Figure 1C:
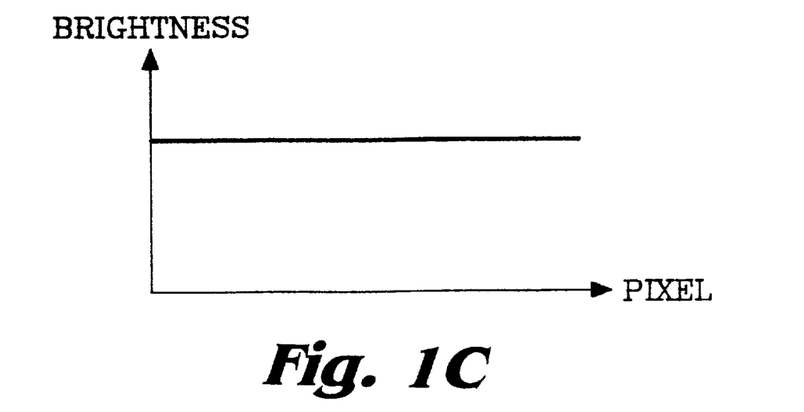
FIG. 1C illustrates a conceptual waveform obtained by shade-correcting the waveforms shown in FIGS. 1A and 1B.

In order to enhance the image quality of a scanned document, shading correction is performed to compensate for imperfections in the shading waveforms. FIG. 1C illustrates a conceptual waveform obtained by shade-correcting the waveforms of FIGS. 1A and 1B. One conventional technique of shading correction is disclosed in Korean Patent No. 93-5322 assigned to the same assignee as the present invention.

Figure 2A:
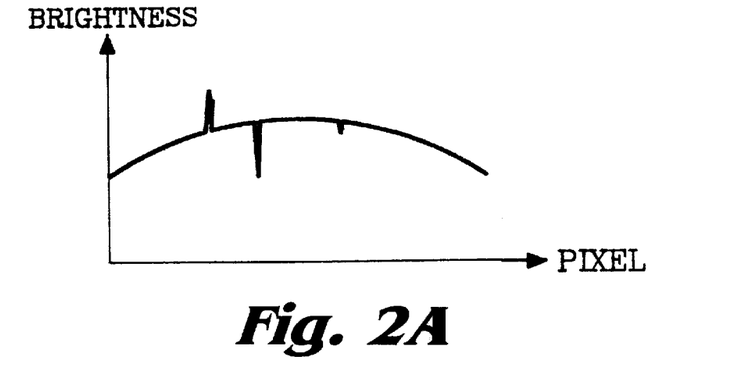
FIG. 2A illustrates a shading waveform including impulse noise.
Figure 2B:
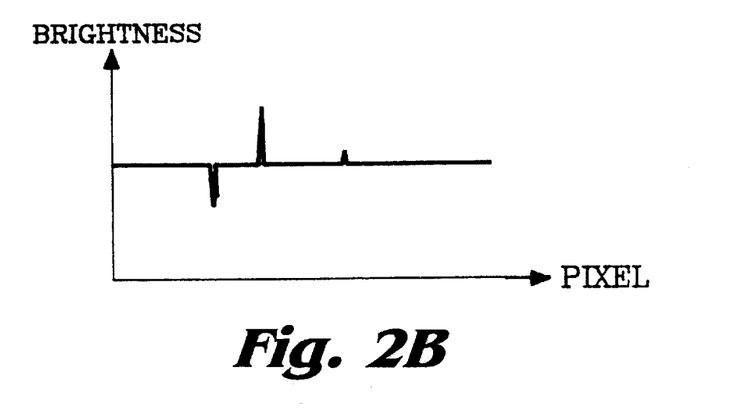
FIG. 2B illustrates the corrected waveform of FIG. 2A.

The shading waveforms described above represent electrical signals obtained through the photoelectric conversion of a white reference (e.g., white panel or white roller), and therefore are directly affected by impulse noise or dust accumulated on the white panel or roller. FIG. 2A illustrates a shading waveform including impulse noise, and FIG. 2B illustrates the corrected waveform of FIG. 2A using the shading correction technique disclosed in Korean Patent No. 93-5322. As indicated in FIG. 2B, it is difficult to achieve an excellent shading correction result by using the shading correction circuit and method disclosed in the above-mentioned Korean Patent No. 93-5322.

In the following description, numerous specific details, such as elements of a specific circuit and so on, are set forth in order to provide a thorough understanding of the present invention. It will be understood by those skilled in the art that other embodiments of the present invention may be practiced without these specific details, or with alternative specific details. Further, a detailed explanation of the function and structure capable of obscuring subject matter of the present invention will not be described.

Figure 3:
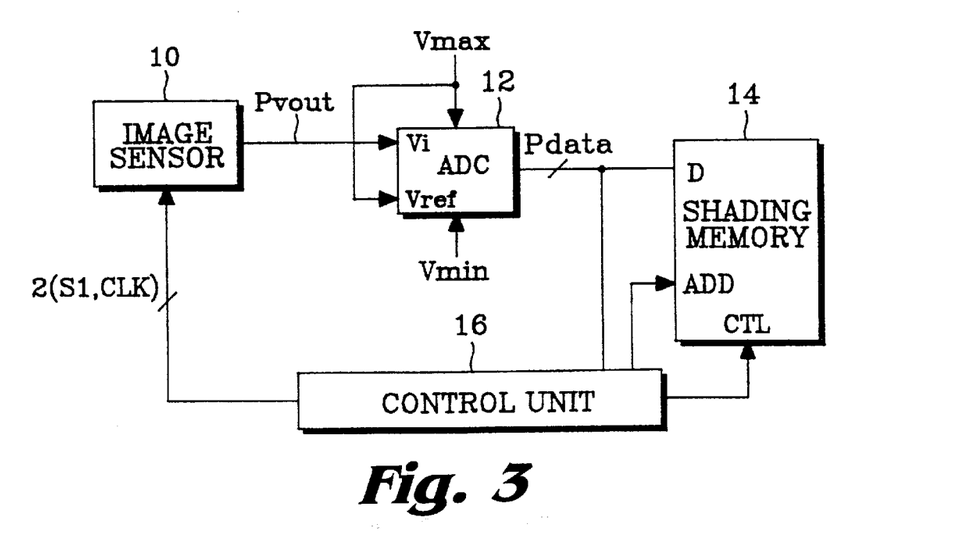
FIG. 3 illustrates a schematic circuit diagram of a shading correction circuit constructed according to the principles of the present invention.

Referring now to FIG. 3, a schematic circuit diagram of a shading correction circuit constructed according to the principles of the present invention. In FIG. 3, an image sensor 10 reads an image borne upon a document in response to a line synchronizing signal S1 and a synchronizing clock signal CLK, and outputs an analog image signal $P_{VOUT}$. An analog-to-digital converter ADC 12 converts the analog image signal $P_{VOUT}$ into digital image data $P_{DATA}$ within a scale range of a given reference voltage $V_{REF}$, and provides output of the digital image data $P_{DATA}$. A shading memory 14 stores the digital image data $P_{DATA}$ output from analog-to-digital converter ADC 12 in an address corresponding to each pixel under the control of a control unit 16. Control unit 16 controls the overall circuit operation, such as the operation of generating the line synchronizing signal S1 and synchronizing clock signal CLK, and an operation of reading the digital image data $P_{DATA}$ stored in shading memory 14 and shade-correcting the read data in line units or in pixel units.

Shading memory 14 preferably includes first, second and third line memory areas for storing digital image data generated in dependence on pixel brightness values according to each line. First, second and third buffer areas are provided for temporarily storing image data stored in the first, second and third line memory areas under a given control. A count area stores given count values, and a shading median storing area stores medians detected by first and second median detectors. In this embodiment for storing the medians detected by the respective detectors, the same line memory is used, but respective line memories can be used for the same purpose.

Control unit 16 preferably includes a first address generator which identically and sequentially assigns addresses for designating pixels from the first pixels to each of the first, second and third buffer areas. A counter counts the number of pixels so that the address generation performed by the first address generator corresponds to the number of pixels stored in one line, and stores the counted result in a count area. A first median detector compares image data from the same column in respective lines stored in the first, second and third buffer areas in response to the addresses assigned by the first address generator to thereby detect the medians of one line. A second address generator generates addresses for sequentially selecting image data to be read in the first median storing area, and then selects image data on each side of the selected image data, as shown in FIG. 4B. A second median detector compares median values stored in the first median storing area corresponding to pixels selected according to addresses generated by the second address generator to thereby detect medians among them, as shown in FIG. 4B.

Figure 4A:
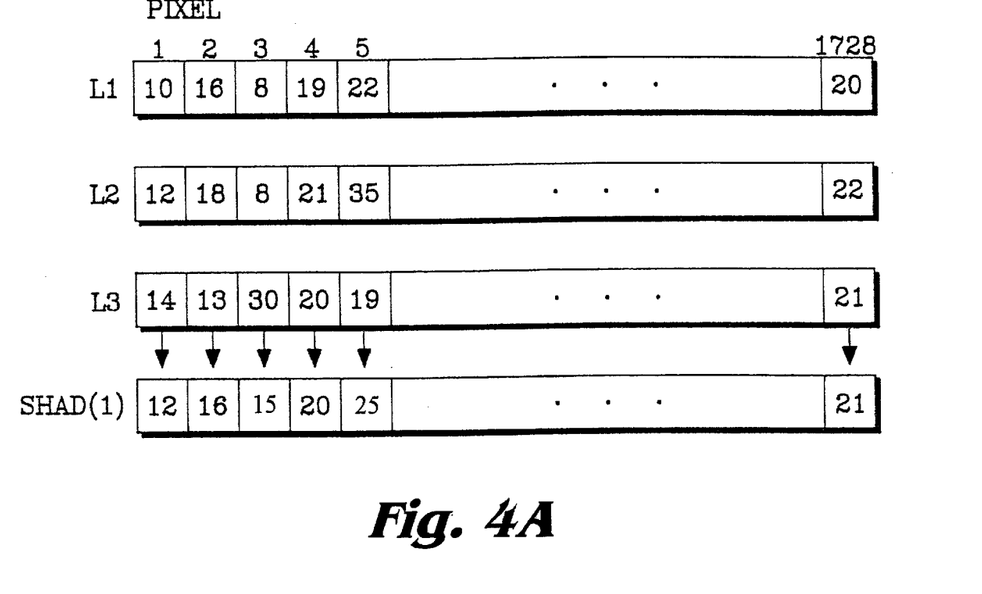
FIGS. 4A and 4B schematically illustrate steps of a shading correction method in accordance with the principles of the present invention.
Figure 4B:
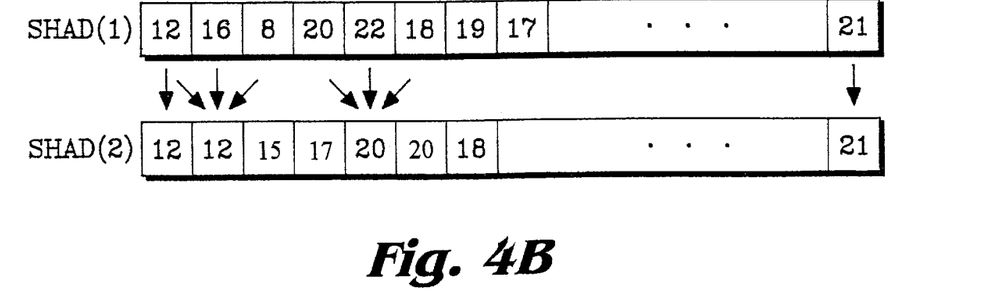

FIGS. 4A and 4B illustrate steps of the shading correction method in accordance with the principles of the present invention. Referring to FIG. 4A, the brightness values of the first pixels in each line stored in the first, second and third line memories (L1–L3) are 10, 12 and 14, respectively. Accordingly, the median among these three values is 12. This median value is stored in the position of the first pixel in the median line memory SHAD (1). Each line of image data is comprised of 1728 pixels.

If this operation of detecting the median according to lines by comparing brightness values of pixels in a column direction is completed and then a new line comprised of 1728 medians is formed, pixels of the formed new line are compared in threes in a row direction as shown in FIG. 4B, and medians among them are selected. At this time, these three pixels are selected so as to include a given pixel and pixels on each side thereof. The first and final medians stored in the median line memory SHAD (2) are equal to the first and final medians stored in median line memory SHAD (1), as shown in FIG. 4B. Medians from the second to 1727th pixels stored in median line memory SHAD (2) are obtained as follows.

For example, the second median stored in median line memory SHAD (2) is obtained from the medians corresponding to positions of the first, second and third pixels stored in median line memory SHAD(1). That is, medians corresponding to positions of the first, second and third pixels stored in median line memory SHAD (1) are 12, 16 and 8, respectively. Among these values, the median is 12. This median value of 12 is stored in the position of the second pixel in median line memory SHAD (2).

Figure 5:
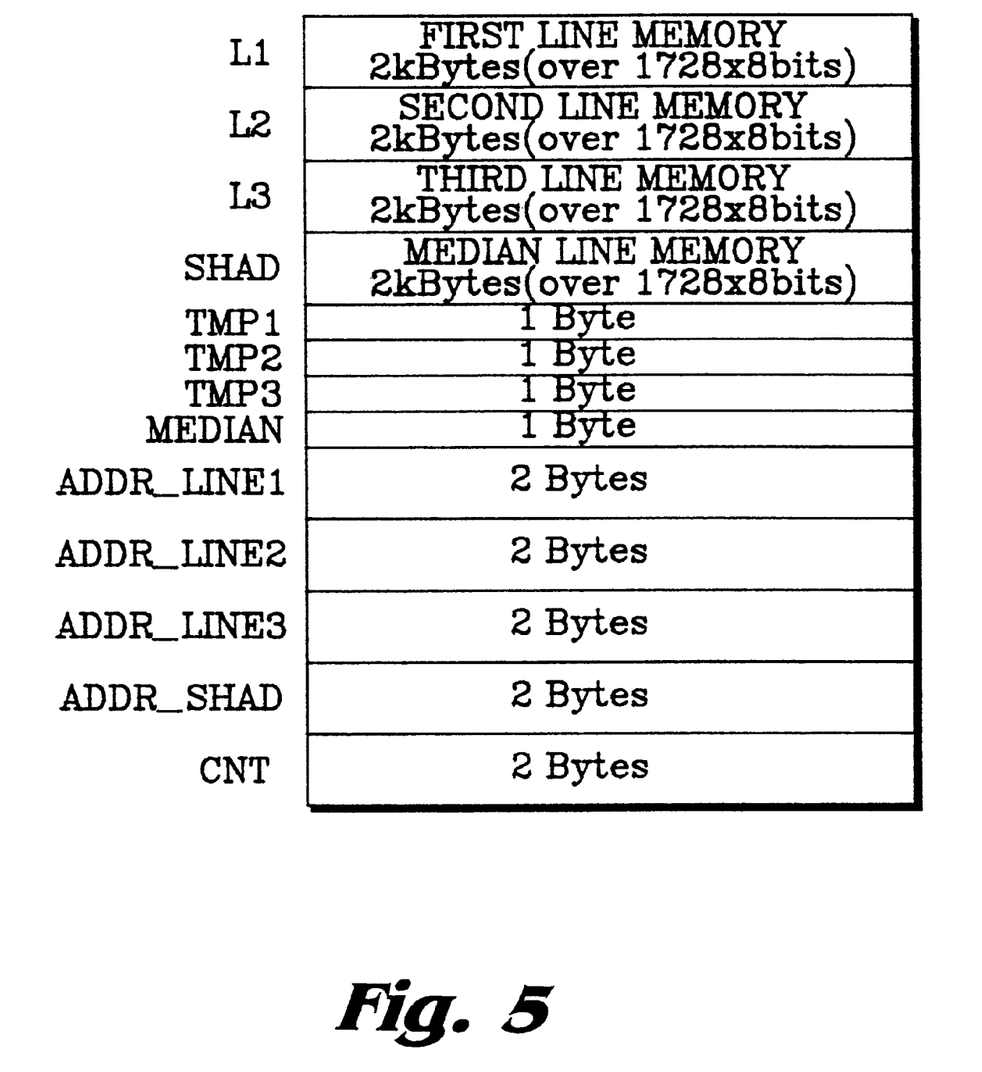
FIG. 5 a diagram illustrating the structure of a shading memory constructed according to the principles of the present invention.

FIG. 5 illustrates the structure of shading memory 14 in accordance with the principles of the present invention. In FIG. 5, for example, if an initial address of the first line memory L1 is 0, an initial address of second line memory L2 becomes "0+0800H=0800H", an initial address of third line memory L3 becomes "0800H+0800H=1000H", and an initial address of the median line memory SHAD becomes "1000H+0800H=1800H".

Figure 6A:
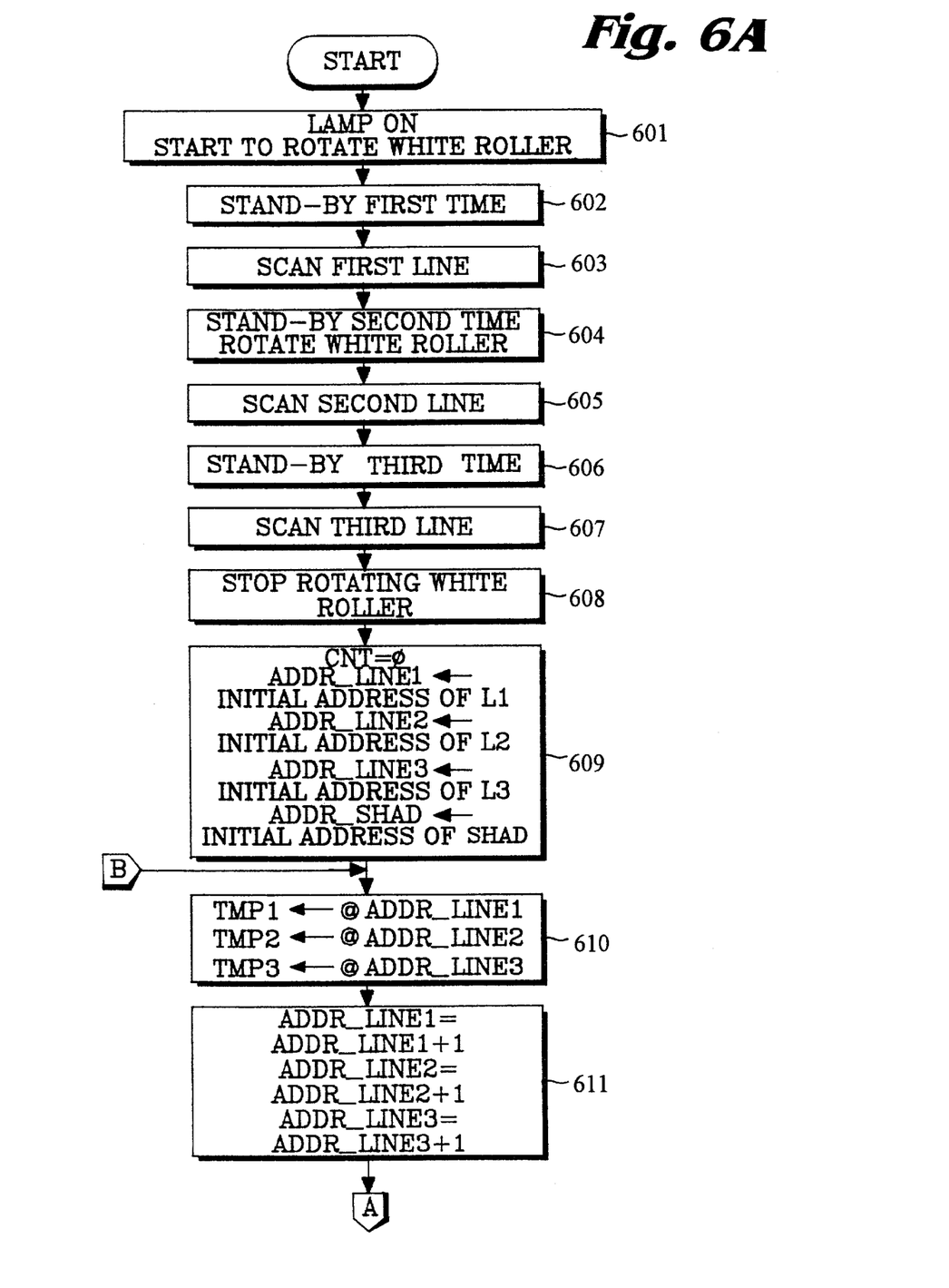
FIGS. 6A and 6B are flow charts illustrating a shading correction method in accordance with the principles of the present invention.
Figure 6B:
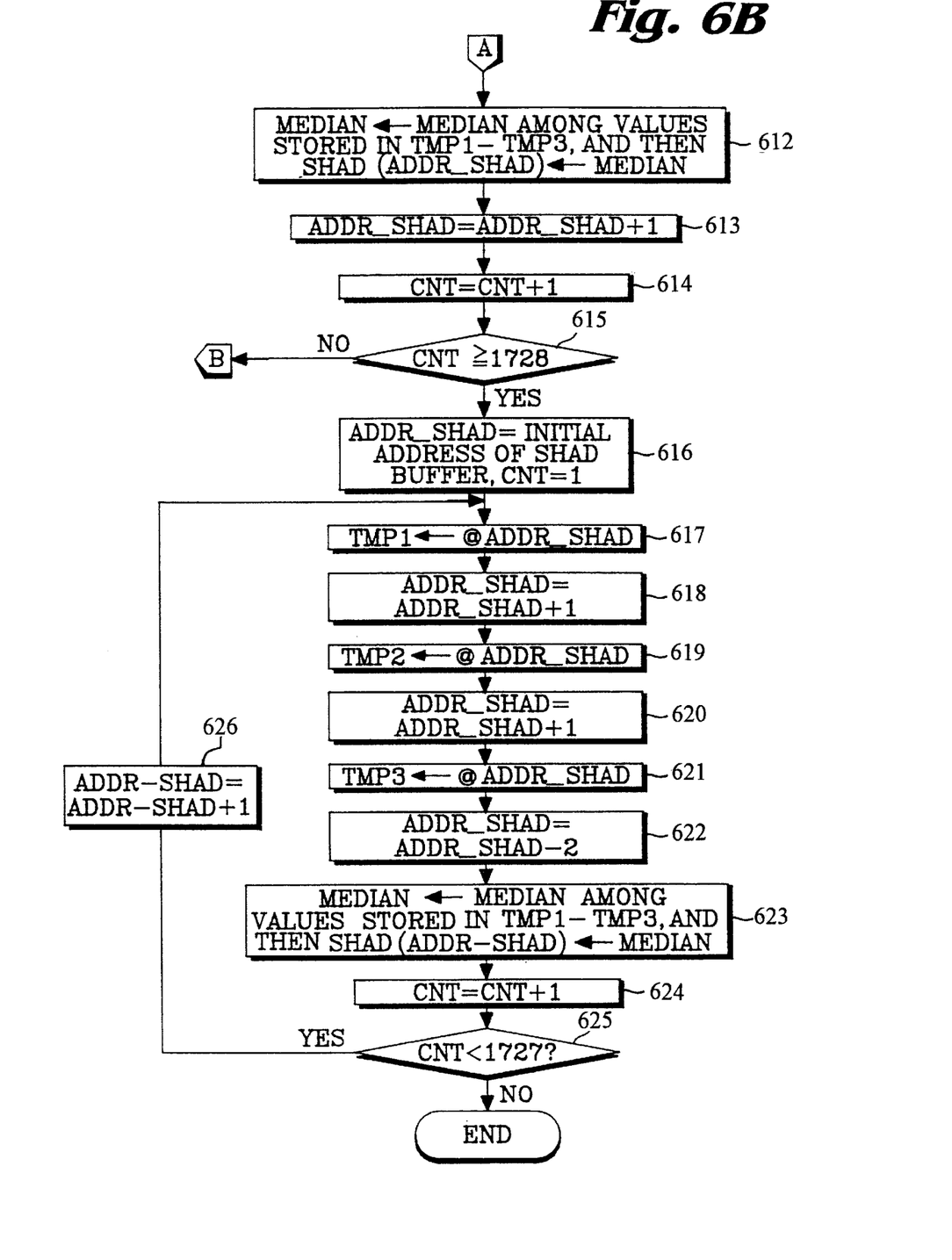

FIGS. 6A and 6B illustrate flow charts of the shading correction method in accordance with the principles of the present invention. In FIGS. 6A and 6B, the reference numerals ADDR_LINE1, ADDR_LINE2, ADDR_LINE3 and ADDR_SHAD respectively represent addresses of the first line memory L1, the second line memory L2, the third line memory L3 and the median line memory SHAD. For the convenience of illustration, however, they are simply referred to as addresses. For example, ADDR_LINE1 is referred to as an address of first line memory L1 that stores brightness values of each pixel in the first line, and accordingly the expression 0≦ADDR_LINE1<0800H holds true.

With reference to FIGS. 6A and 6B, the shading correction method in accordance with the principles of the present invention will now be explained.

In step 601, control unit 16 turns on a lamp of image sensor 10, and starts to rotate a white roller using a motor. Control unit 16 stands-by for a first given period of time (e.g., 300 milliseconds) in step 602, and then scans the first line in step 603. The scanned data is stored in the first line memory L1 of shading memory 14, as shown in FIG. 5. Control unit 16 stands-by for a second given period of time (e.g., 100 milliseconds) while the white roller continues to rotate, in step 604. Since the white roller continuously rotates during the second period of time, the adverse effects due to dust on the white roller can be prevented. After the second period of time has elapsed, control unit 16 scans the second line of the document in step 605, and the scanned data is stored in the second line memory L2 of shading memory 14. Control unit 16 stands-by for a third given period of time in step 606, and then scans the third line in step 607. This scanned data from the third line is stored in the third line memory L3 of shading memory 14. Rotation of the white roller is stopped in step 608.

As described in the previous steps, control unit 16 sequentially scans the first, second and third lines of the document, and stores the brightness value of each pixel according to each line. In step 609, control unit 16 initializes various index values. That is, control unit 16 initializes the counter value CNT, ADDR_LINE1, ADDR_LINE2, ADDR_LINE3, and ADDR_SHAD.

In order to compare brightness values of pixels on the same column in the first, second and third lines, control unit 16 reads the brightness values of the pixels from the first, second and third line memories L1, L2 and L3 corresponding to index values of ADDR_LINE1, ADDR_LINE2 and ADDR_LINE3, respectively, and stores the read data in first, second and third comparing buffers TMP1–TIMP3, in step 610. Control unit 16 then increases the index values of ADDR_LINE1 through ADDR_LINE3 by one in step 611. In step 612, control unit 16 selects medians from among the brightness values of pixels stored in TMP1–TMP3, temporarily stores the median values in a median buffer MEDIAN, and again stores the medians in the median line memory SHAD designated by ADDR_SHAD. Control unit 16 increases the index value of ADDR_SHAD by one in step 613, and increases the count value CNT by one in step 614. Then, in step 615, control unit 16 determine whether or not the count value CNT is greater than or equal to 1728. This exemplary number corresponds to the number of pixels for one line, based on A4 sized paper as a reference. If the count value CNT is less than 1728, control unit 16 returns to step 610 for reading the brightness values of the next pixels from the line memories L1–L3.

When the operations described above are completed, the 1728 median values are stored in the median line memory SHAD. In step 616, control unit 16 sets the ADDR_SHAD and the count value CNT to initial values. The brightness value of the pixel in median line buffer SHAD corresponding to the present ADDR_SHAD is stored in first comparing buffer TMP1 in step 617, and ADDR_SHAD is incremented by one in step 618. The brightness value of the pixel in median line buffer SHAD corresponding to the incremented ADDR_SHAD is stored in second comparing buffer TMP2 in step 619, and ADDR_SHAD is incremented by one in step 620. Then, the brightness value of the pixel in median line buffer SHAD corresponding to the incremented ADDR_SHAD is stored in third comparing buffer TMP3 in step 621, and ADDR_SHAD is decremented by two in step 622. In step 623, control unit 16 calculates medians among the brightness values stored in comparing buffers TMP1–TMP3. These median values are temporarily stored in the median buffer MEDIAN, and are then stored in the median line memory SHAD in correspondence with the decremented ADDR_SHAD. (Note that median line memory SHAD is referred to as SHAD (2) in the explanation of FIG. 4B, and also referred to as SHAD (1) in the explanation of FIG. 4A.)

Control unit 16 increases the count value CNT by one in step 624, and then determines whether or not the count value CNT is less than 1727 in step 625. Although the number of pixels in one line in this embodiment of the present invention is 1728, it should be noted that the value 1727 is used in step 625 in the consideration of the boundary of a page. In step 625, if the count value CNT is less than 1727, control unit 16 increments ADDR_SHAD by one in step 626, and returns to step 617 to read the next three applicable brightness values, and calculate the median among those values.

As a result of performing the method of FIGS. 6A and 6B, a shading waveform can be produced from the final line of brightness values. From this shading waveform, a shading factor for each pixel is generated. These shading factors are then used to perform shading correction when reading a given document.

As is apparent from the foregoing, the present invention has an advantage in that it is capable of avoiding the adverse effects that are generated due to impulse noise, or dust that is accumulated on the white reference panel or roller.

While there have been illustrated and described what are considered to be preferred embodiment of the present invention, it will be understood by those skilled in the art that various changes and modifications may be, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A shading correction circuit for an image processing system, comprising:

an image sensor for scanning a white reference source to generate analog image data representative of brightness values of three consecutive lines of pixels;

an analog-to-digital converter for converting the analog image data output from said image sensor into digital image data;

first, second and third line memories for respectively storing the digital image data corresponding to first, second and third lines of said three consecutive lines of pixels;

first, second and third buffers for temporarily storing the digital image data stored in said first, second and third line memories, respectively;

a first address generating unit for sequentially generating first addresses for assigning the digital image data to said first, second and third buffers;

a counting unit for maintaining a count value so that generation of said first addresses by said first address generating unit corresponds to a number of pixels in one line;

a first median detecting unit for reading the digital image data stored in said first, second and third buffers in response to generation of said first addresses, and detecting first median brightness values from the digital image data, each said first median brightness value representing an average of brightness values of pixels from a same column and each of said three consecutive lines;

a first median storing unit for storing said first median brightness values detected by said first median detecting unit in correspondence with said first addresses generated by said first address generating unit;

a second address generating unit for generating second addresses to enable reading of said first median brightness values stored in said first median storing unit;

a second median detecting unit for reading said first median brightness values stored in said first median storing unit in response to generation of said second addresses, and detecting second median brightness values from said first median brightness values, each second median brightness value other than first and last ones of said second median brightness values representing an average of a first median brightness value of a corresponding pixel and first median brightness values of pixels positioned on first and second sides of said corresponding pixel; and a second median storing unit for storing said second median brightness values detected by said second median detecting unit in correspondence with the second addresses generated by said second address generating unit.

2. The shading correction circuit as claimed in claim 1, wherein each line is comprised of 1728 pixels.

3. The shading correction circuit as claimed in claim 2, wherein said second median brightness values are used to generate a shading waveform.

4. The shading correction circuit as claimed in claim 1, wherein said second median brightness values are used to generate a shading waveform.

5. The shading correction circuit as claimed in claim 1, wherein said first and last ones of said second median brightness values are respectively set equal to first and last ones of said first median brightness values.

6. The shading correction circuit as claimed in claim 5, wherein each line is comprised of 1728 pixels.

7. The shading correction circuit as claimed in claim 5, wherein said second median brightness values are used to generate a shading waveform.

8. The shading correction circuit as claimed in claim 7, wherein each line is comprised of 1728 pixels.

9. A shading correction method for an image processing system, comprising the steps of:

sequentially scanning first, second and third lines of a white reference and storing a brightness value of each pixel according to each line;

averaging brightness values of pixels from identical columns in said first, second and third lines to calculate first median brightness values;

generating a first new line comprised of pixels having said first median brightness values:

sequentially selecting pixels of said first new line, each selected pixel being other than first and last ones of pixels in said first new line;

averaging first median brightness values of each selected pixel and pixels on first and second sides of said selected pixel to calculate second median brightness values; and generating a second new line comprised of pixels having said second median brightness values with first and last ones of pixels of said second new line having second median brightness values being respectively set equal to first median brightness values of said first and last ones of pixels of said first new line.

10. The shading correction method as claimed in claim 9, wherein each line is comprised of 1728 pixels.

11. The shading correction method as claimed in claim 10, further comprising the step of generating a shading waveform from said second new line of pixels having said second median brightness values.

12. The shading correction method as claimed in claim 9, further comprising the step of generating a shading waveform from said second new line of pixels having said second median brightness values.

13. A shading correction method for an image processing system, comprising the steps of:

scanning a white reference source to generate first, second and third lines of pixel brightness values;

generating a line of first brightness values from said first, second and third lines of pixel brightness values, each first brightness value being an average of pixel brightness values from a common column of said first, second and third lines; and generating a line of second brightness values from said line of said first brightness values, each second brightness value, other than first and last ones of said second brightness values, being an average of a first brightness value of a corresponding pixel and first brightness values of pixels positioned on first and second sides of said corresponding pixel.

14. The shading correction method as claimed in claim 9, wherein said first and last ones of said second brightness values within said line of second brightness values are respectively set equal to first and last ones of said first brightness values within said line of first brightness values.

15. The shading correction method as claimed in claim 14, further comprising the step of generating a shading waveform from said line of said second brightness values.

16. The shading correction method as claimed in claim 15, wherein each line is comprised of 1728 pixels.

17. The shading correction method as claimed in claim 14, wherein each line is comprised of 1728 pixels.

18. The shading correction method as claimed in claim 13, further comprising the step of generating a shading waveform from said line of said second brightness values.

19. The shading correction method as claimed in claim 13, wherein each line is comprised of 1728 pixels.

20. The shading correction method as claimed in claim 18, wherein each line is comprised of 1728 pixels.

* * * * *